US012487896B2

(12) United States Patent
Jun et al.

(10) Patent No.: US 12,487,896 B2
(45) Date of Patent: Dec. 2, 2025

(54) QUANTUM DIAGNOSTIC CIRCUIT AND QUANTUM CHARACTERISTIC DIAGNOSTIC METHOD

(71) Applicant: ELECTRONICS AND TELECOMMUNICATIONS RESEARCH INSTITUTE, Daejeon (KR)

(72) Inventors: Sungik Jun, Daejeon (KR); Kwang-Won Koh, Daejeon (KR); Kang Ho Kim, Daejeon (KR); Changdae Kim, Daejeon (KR); Taehoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1034 days.

(21) Appl. No.: 17/542,324

(22) Filed: Dec. 3, 2021

(65) Prior Publication Data

US 2022/0197764 A1  Jun. 23, 2022

(30) Foreign Application Priority Data

Dec. 21, 2020 (KR) .................... 10-2020-0179529

(51) Int. Cl.
*G06N 10/70* (2022.01)
*G06F 11/22* (2006.01)
(Continued)

(52) U.S. Cl.
CPC ........ *G06F 11/2236* (2013.01); *G06F 11/261* (2013.01); *G06N 10/60* (2022.01); *G06N 10/70* (2022.01)

(58) Field of Classification Search
None
See application file for complete search history.

(56) References Cited

U.S. PATENT DOCUMENTS 10,733,522 B2   8/2020 Curtis et al.
11,562,284 B1 * 1/2023 Ryan ...................... G06N 10/00
                              (Continued)

FOREIGN PATENT DOCUMENTS

KR    1020180043157 A    4/2018

OTHER PUBLICATIONS

Colin P. Williams; "Explorations in Quantum Computing", Second edition, ISSN 1868-0941, ISBN 978-1-84628-886-9, e-ISSN 1868-095X, e-ISBN 978-1-84628-887-6, DOI 10.1007/978-1-84628-887-6, Springer London Dordrecht Heidelberg New York, 2011.

(Continued)

*Primary Examiner* — Xuyang Xia
(74) *Attorney, Agent, or Firm* — Rabin & Berdo, P.C.

(57) ABSTRACT

Disclosed is a quantum diagnostic circuit, which includes an input unit having an input of at least first to fourth qubits, a diagnostic circuit unit receiving the first to fourth qubits from the input unit and providing a quantum superposition and a quantum entanglement, and an output unit receiving an output of the diagnostic circuit unit and determining whether the output is in a Bell-state, and the diagnostic circuit unit includes a Hadamard gate processing the first qubit to provide the quantum superposition of the first to fourth qubits, a first CNOT gate providing the quantum entanglement between an output of the Hadamard gate and the second qubit, a second CNOT gate providing the quantum entanglement between an output of the first CNOT gate and the third qubit, and a third CNOT gate providing the quantum entanglement between an output of the second CNOT gate and the fourth qubit.

8 Claims, 8 Drawing Sheets

(51) Int. Cl.
*G06F 11/26* (2006.01)
*G06N 10/60* (2022.01)

(56) References Cited

U.S. PATENT DOCUMENTS

| | | | |
|---|---|---|---|
| 2006/0123363 A1* | 6/2006 | Williams | G06N 10/20 |
| | | | 977/839 |
| 2010/0251049 A1 | 9/2010 | Goto et al. | |
| 2014/0280427 A1 | 9/2014 | Bocharov et al. | |
| 2015/0206061 A1* | 7/2015 | Morello | G06N 10/20 |
| | | | 706/52 |
| 2017/0179960 A1* | 6/2017 | Hastings | G06N 10/20 |
| 2018/0157986 A1* | 6/2018 | Oxford | G06N 10/20 |
| 2018/0314969 A1* | 11/2018 | Thornton | G06N 10/20 |
| 2019/0020345 A1 | 1/2019 | Kim et al. | |
| 2019/0244128 A1* | 8/2019 | Choi | G06N 10/20 |
| 2020/0272926 A1* | 8/2020 | Chaplin | G06F 30/337 |
| 2020/0401927 A1* | 12/2020 | Nickerson | G06N 10/40 |

OTHER PUBLICATIONS

Diogo Cruz et al; "Effcient quantum algorithms for GHZ and W states, and implementation on the IBM quantum computer", arXiv:1807.05572v1 [quant-ph] Jul. 15, 2018.

Paramita Ray; "Decomposition of Quantum Gates with Primitives Quantum Operations", International Journal of Advanced Research in Computer Science, vol. 7, No. 1, ISSN No. 0976-5697, Jan.-Feb. 2016.

* cited by examiner

QUANTUM DIAGNOSTIC CIRCUIT AND QUANTUM CHARACTERISTIC DIAGNOSTIC METHOD

CROSS-REFERENCE TO RELATED APPLICATIONS

This application claims priority under 35 U.S.C. § 119 to Korean Patent Application No. 10-2020-0179529, filed on Dec. 21, 2020, in the Korean Intellectual Property Office, the disclosures of which are incorporated by reference herein in their entireties.

BACKGROUND

Embodiments of the present disclosure described herein relate to a quantum circuit, and more particularly, relate to a quantum diagnostic circuit and a quantum characteristic diagnostic method that help a quantum computer or a physical qubit device diagnoses a component of gates support characteristic and a error characteristic of physical qubits by using the quantum diagnostic circuit, and help the quantum computer or the quantum compiler generates a reliable quantum qubit circuit by reference a characteristic of the physical qubits.

Algorithms that increase the computational complexity by exponential power in traditional computers are known to be partially executable in polynomial time in quantum computers. Unlike traditional computers, quantum computers have very high parallelism due to quantum entanglement and quantum superposition properties. Therefore, there has been a development in a use of quantum computing for an identification of physical phenomena and chemical principles that have not been solved in the past. However, the reality is that the quantum computers have very serious error characteristics in quantum decoherence due to difficulties in implementation of quantum mechanics. Therefore, fields of a computer research and a quantum error correction technology that allow quantum defects have been developed.

In the conventional art, a method of increasing the number of qubits (quantum bits) and a method of reducing the error of qubits have been searched, but it is difficult to see that general-purpose quantum computing is possible yet because a difference in the degree of error is large. It can only be seen that optimization is being done at the quantum circuit level. Quantum algorithms are created at the circuit level for quantum information processing, and quantum circuits can be created and tested in various versions. In a digital logic circuit, a variety of complex and different logic gates may be expressed or implemented using NAND gates or NOR gates. In a similar manner as described above, in a quantum circuit, research to find a universal gate set that proves that a circuit can be replaced with another gate for designing a gate-based algorithm is being conducted. The universal gate set may include a Hadamard Gate (or H Gate), a T-gate, and a CNOT (Controlled NOT, CX gate) gate.

Research to configure quantum circuits with only specific gates and experiments to replace the circuits into these universal gate sets are being conducted. However, there are many cases where even a typical quantum gate cannot be supported depending on a physical qubit implementation method. Therefore, it is often necessary to replace the universal gate set with another gate. Quantum compilers have been developed to solve this issue.

However, before executing the quantum algorithm, it will be possible to provide a quantum algorithm only with circuit gates that are converted by reflecting characteristics in the quantum compiler only after extracting the characteristics of quantum circuit gates that can be supported by quantum machines. It is not special to diagnose a quantum computer by varying input/output conditions of the quantum computer. However, a core of the design is to comprehensively configure the quantum superposition, the quantum entanglement, and a quantum measurement using the quantum circuit with respect to the quantum computer, and to diagnose a state or characteristics of the quantum computer by using change patterns based on the input/output conditions.

In the diagnosis of quantum qubits through quantum circuits, different control methods should be used from a single qubit to multiple qubits, or depending on the implementation method. Therefore, a diagnostic method of a quantum circuit independent in the implementation method is required. In a conventional Bell-state theory, for an input '|0>' and '|1>', '(|0>+|1>)/√2', '(|0>-|1>)/√2' is represented as an output. However, when it is a circuit gate that induces the quantum superposition and induces the quantum entanglement between multiple qubits through a CNOT gate, and when the first qubit (control qubit) is '0', the input is sent to the output as it is in the second qubit (target qubit). In addition, when the first qubit (C) is '1', logical NOT is applied to the second qubit (T) to output '0->1' and '1->0'.

A '-H-CNOT12-M-' circuit implementing the Bell-state is widely used as a basic function to check the quantum superposition and the quantum entanglement. When the physical qubits are implemented, it is first checked whether the Bell-state indicates the same results as the theory. A '-H_CNOT$_{12}$-CNOT23-M-' circuit, called a GHZ circuit, which is an expansion of the above circuit, is a representative circuit that observes the entanglement of three physical qubits. Therefore, these circuits are implemented as primitive circuits and the performance of physical qubits is tested. To construct an algorithm, general quantum circuit gates may include various gates such as a X, Y, Z gate which is a Pauli-gate, and a Rotation x, y, z, a Control-Not, a Control-phase, a Control-Control-NOT, a 'T', a SWAP, a Control-SWAP, a ISWAP gate, a Unitary Gate, etc., in addition to a 'H', an '5', and a CNOT. When an input is provided to multiple circuit gates with the quantum superposition and entanglement like '-H-CNOT-M-', since an operation proceeds while the superposition is maintained and the output also generates a result that reflects the superposition, the quantum circuit gates are very difficult to debug, unlike conventional digital gates.

Executing a program of the quantum circuit proceeds in three major steps. That is, a quantum initialization, a quantum circuit operation, and an output verification in the quantum measurement step are included in the above three steps. In this case, since it is necessary to analyze the characteristics of quantum computation by taking advantages of the diversity of quantum circuits and quantum state injection to describe quantum algorithms, in the first step, the circuit for the quantum algorithm is configured to reflect the quantum superposition property. When the quantum circuit goes through quantum state evolution and reaches the final quantum state (i.e., when all quantum circuits are reflected and applied), the quantum calculation is completed by measuring it. Therefore, it is necessary to test a quantum circuit before making a gate, a quantum compiler, or a quantum error correction device for use in the quantum algorithm. However, due to the lack of a suitable quantum verification circuit, a quantum compiler is constructed depending on the implementation characteristics of individual gates.

The present disclosure will provide a means and method capable of a simple but comprehensive diagnosis in diagnosing a quantum physical device through a quantum circuit, and that users can always try before executing an applied quantum algorithm.

SUMMARY

Embodiments of the present disclosure provide a quantum diagnostic circuit and a quantum characteristic diagnosis method for facilitating the diagnosis of errors or characteristics in designing and verifying a quantum circuit. In particular, the present disclosure is easy to apply when equipped with a quantum simulator and a quantum computer, and may be utilized as useful means and methods when verifying simulation performance of a quantum simulator or expanding an application field of a quantum simulator. Above all, according to the present disclosure, it is easy to verify and diagnose a plurality of physical qubits.

In implementing the same circuit by creating a circuit in the quantum simulation stage, verifying it, and then transferring it to physical qubits, it is very important to find out whether the results are accurate due to the severity of errors in real quantum computers, and which part of the circuit or which part of the physical qubits is faulty. The present disclosure allows to be applicable as a reference quantum circuit capable of analyzing the characteristics of a system prior to executing a user's quantum circuit, by adding a quantum diagnostic circuit to solve these difficult problems. Therefore, through the quantum diagnostic circuit and quantum characteristic diagnosis method of the present disclosure, even circuits that have succeeded in quantum simulation are designed such that characteristics of quantum qubits may be extracted and a quantum circuit suitable for it may be generated before being directly used in real quantum computers.

According to an embodiment of the present disclosure, a quantum diagnostic circuit includes an input unit that has an input of at least first to fourth qubits, a diagnostic circuit unit that receives the first to fourth qubits from the input unit and provides a quantum superposition and a quantum entanglement, and an output unit that receives an output of the diagnostic circuit unit and determines whether the output is in a Bell-state, and the diagnostic circuit unit includes a Hadamard gate that processes the first qubit to provide the quantum superposition of the first to fourth qubits, a first CNOT gate that provides the quantum entanglement between an output of the Hadamard gate and the second qubit, a second CNOT gate that provides the quantum entanglement between an output of the first CNOT gate and the third qubit, and a third CNOT gate that provides the quantum entanglement between an output of the second CNOT gate and the fourth qubit.

According to an embodiment of the present disclosure, a method of diagnosing quantum characteristics of a quantum computer or a physical qubit device includes (a) starting up the quantum computer or the physical qubit device, (b) connecting a quantum control system with the quantum computer or the physical qubit device, (c) decoding the quantum diagnostic circuit by the quantum control system and installing the quantum diagnostic circuit in the quantum computer or the physical qubit device, (d) collecting and analyzing a change in a quantum physical state of the quantum computer or the physical qubit device via the quantum control system, by using the quantum diagnostic circuit, (e) determining that the quantum physical state of the quantum computer or the physical qubit device is normal when the analyzed change in the quantum physical state is within a range of an expected target value, and determining that the quantum computer or the physical qubit device includes an error when the analyzed change in the quantum physical state is out of the range of the expected target value, and (f) iterating operations (a) to (e) by varying an input vector of the quantum diagnostic circuit, based on a pre-generated look-up table when it is determined that the error is included in the physical qubit device.

BRIEF DESCRIPTION OF THE FIGURES

The above and other objects and features of the present disclosure will become apparent by describing in detail embodiments thereof with reference to the accompanying drawings.

DETAILED DESCRIPTION

It is to be understood that both the foregoing general description and the following detailed description are examples, and it is intended that an additional description of the claimed disclosure is provided. Reference numerals are indicated in detail in preferred embodiments of the present disclosure, examples of which are indicated in the reference drawings. Wherever possible, the same reference numerals are used in the description and drawings to refer to the same or like parts. Hereinafter, embodiments of the present disclosure will be described with reference to the accompanying drawings such that those skilled in the art may easily carry out the present disclosure.

Figure 1A:
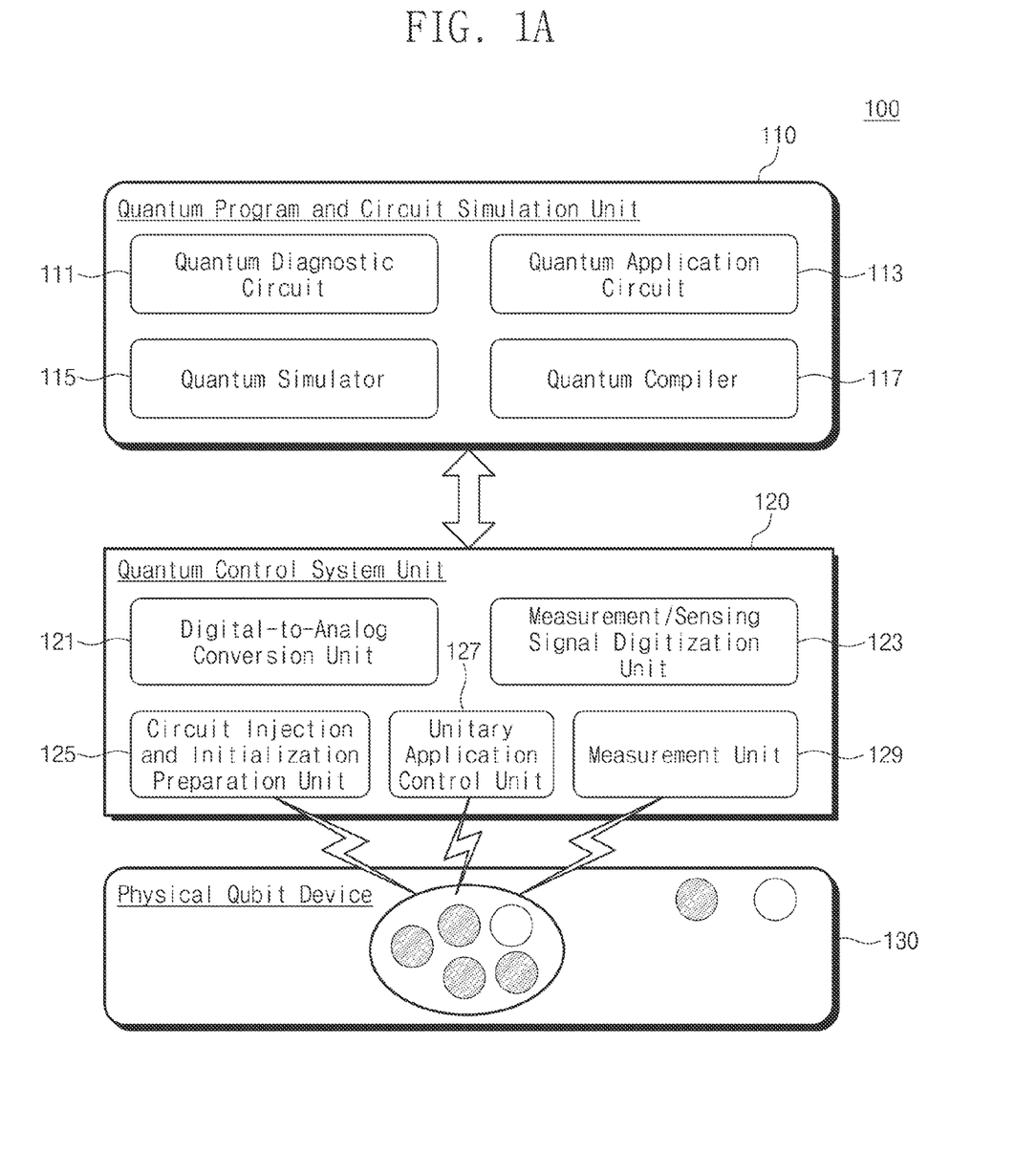
FIGS. 1A and 1B are block diagrams illustrating a system and a quantum computing architecture according to the present disclosure.
Figure 1B:
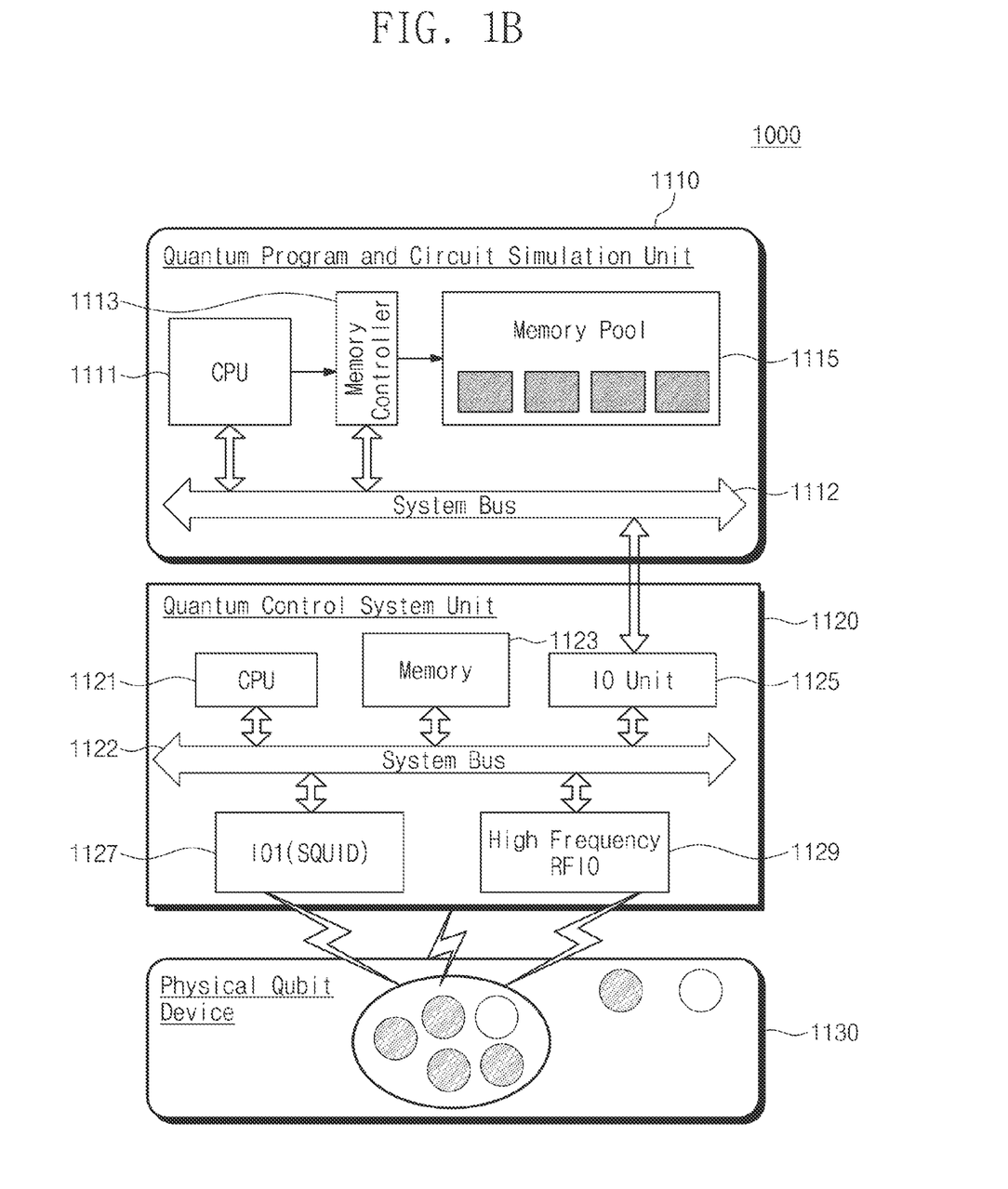

FIGS. 1A and 1B are block diagrams illustrating a system and a quantum computing architecture according to the present disclosure.

FIG. 1A illustrates a system 100 to which the present disclosure is applied. Referring to FIG. 1A, the system 100 of the present disclosure includes a quantum program and circuit simulation unit 110 including a quantum diagnostic circuit 111, a quantum control system unit 120, and a physical qubit device 130. As will be described later, the quantum diagnostic circuit 111 of the present disclosure is mounted on the quantum program and circuit simulation unit 110. The quantum diagnostic circuit 111 transfers a quantum control signal to the physical qubit device 130 via the quantum control system unit 120 and collects the results. The quantum diagnostic circuit 111 converts a widely known quantum computation language and a quantum circuit gate expression into a control machine language without using a special command or an application program interface (API), transfers the converted control machine language, and receives a result which is a standard format.

The quantum program and circuit simulation unit 110 may include the quantum diagnostic circuit 111, a quantum application circuit 113, a quantum simulator 115, and a quantum compiler 117. The quantum program and circuit simulation unit 110 may be implemented with software (SW) in a traditional computer (PC, host server, supercomputer, etc.). The quantum simulator 115 simulates the quantum diagnostic circuit 111. To verify the quantum diagnostic circuit 111 on the physical qubit device 130, the quantum compiler 117 converts the quantum circuit into a machine language and transmits the converted machine language via the quantum control system unit 120. The quantum program and circuit simulation unit 110 diagnoses the characteristics of quantum physical qubits by comparing an experimental result of the physical qubits for the quantum diagnostic circuit 111 with target value of the quantum simulation result. The quantum compiler 117 includes a function of converting quantum circuit-level symbols into a machine language supported by physical qubits, and may be implemented with a general-purpose quantum compiler.

The quantum control system unit 120 may include a digital-to-analog conversion unit 121, a measurement/sensing signal digitization unit 123, a circuit injection and initialization preparation unit 125, a unitary application control unit 127, and a measurement unit 129. The quantum control system unit 120 may be connected to the quantum program and circuit simulation unit 110 through an input/output device (e.g., serial communication interface, high-speed communication interface).

The digital-to-analog conversion unit 121 converts a digital control signal into an analog control signal. The measurement/sensing signal digitization unit 123 converts analog signals measured or sensed by the physical qubit device 130 into digital signals. The circuit injection and initialization preparation unit 125 performs injection and initialization of the quantum circuit provided by the quantum program and circuit simulation unit 110 into the physical qubit device 130. The unitary application control unit 127 performs a unitary conversion that changes an intrinsic state amplitude of the qubits so as to perform the quantum operation in the physical qubit device 130. For example, the unitary application control unit 127 may perform a conversion that rotates qubits on a Bloch sphere. In fact, for unitary conversion, a magnetic field or a laser pulse may be applied. The measurement unit 129 measures a quantum state of the physical qubit device 130. A result of the quantum state measured by the measurement unit 129 will be provided to the quantum program and circuit simulation unit 110.

The physical qubit device 130 may be configured in various ways, such as a superconductor method, an ion trap method, an artificial atom qubit method, a quantum dot (QD) method, a linear photon qubit method, an artificial molecular qubit method, etc. depending on a quantum computer implementation method. However, the physical qubit device 130 includes a purpose of actually measuring and diagnosing the quantum characteristics on the premise of implementation based on the quantum circuit.

In this case, the quantum program and circuit simulation unit 110 is capable of simulation based on a circuit and is compatible without depending on a designer and a manufacturer. The physical qubit device 130 may be implemented without distinguishing between a cloud-based quantum computer and a noise intermediate-scale quantum (NISQ) general-purpose quantum computer. The quantum diagnostic circuit 111 may provide a quantum state test diagnosis and interworks with the quantum program and circuit simulation unit 110, the quantum control system unit 120, and the physical qubit device 130 to diagnose and provide target quantum characteristics.

FIG. 1B is a block diagram illustrating a structure of a physical hybrid quantum computer describing a system to which the present disclosure is applied in terms of hardware. Referring to FIG. 1B, a system 1000 of the present disclosure may be represented by a quantum program and circuit simulation unit 1110, a quantum control system unit 1120, and a physical qubit device 1130.

The quantum program and circuit simulation unit 1110 may include a CPU 1111 for driving software such as the quantum diagnostic circuit 111, the quantum application circuit 113, the quantum simulator 115, and the quantum compiler 117 of FIG. 1A, a memory controller 1113, a memory pool 1115, and a system bus 1112. The memory pool 1115 may be configured with at least one of a DRAM, an SRAM, and a flash memory. The system bus 1112 provides a channel for exchanging data and control signals between the CPU 1111 and the memory controller 1113. In addition, an input/output device of a serial communication method or a high-speed communication method provides a connection with the quantum control system unit 1120 via the system bus 1112.

The quantum control system unit 1120 may also be implemented with an embedded device having a CPU 1121, a memory 1123, an input/output (IO) unit 1125, and a system bus 1122. A superconducting quantum interference device (SQUID) interface 1127 may be provided or a very high frequency RF device 1129 may be included depending on the input/output method of the quantum physical device.

The physical qubit device 1130 may be configured in various ways, such as a superconductor method, an ion trap method, an artificial atom qubit method, a quantum dot (QD) method, a linear photon qubit method, and an artificial molecular qubit method, depending on a quantum computer implementation method.

Figure 2A:
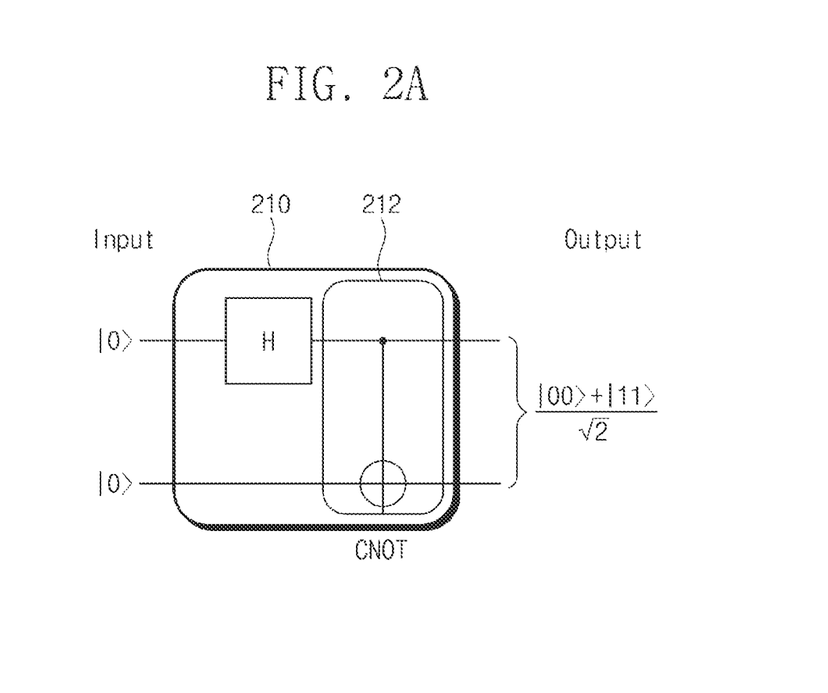
FIGS. 2A to 2C are diagrams illustrating quantum superposition entanglement circuits according to a Bell-state theory.
Figure 2B:
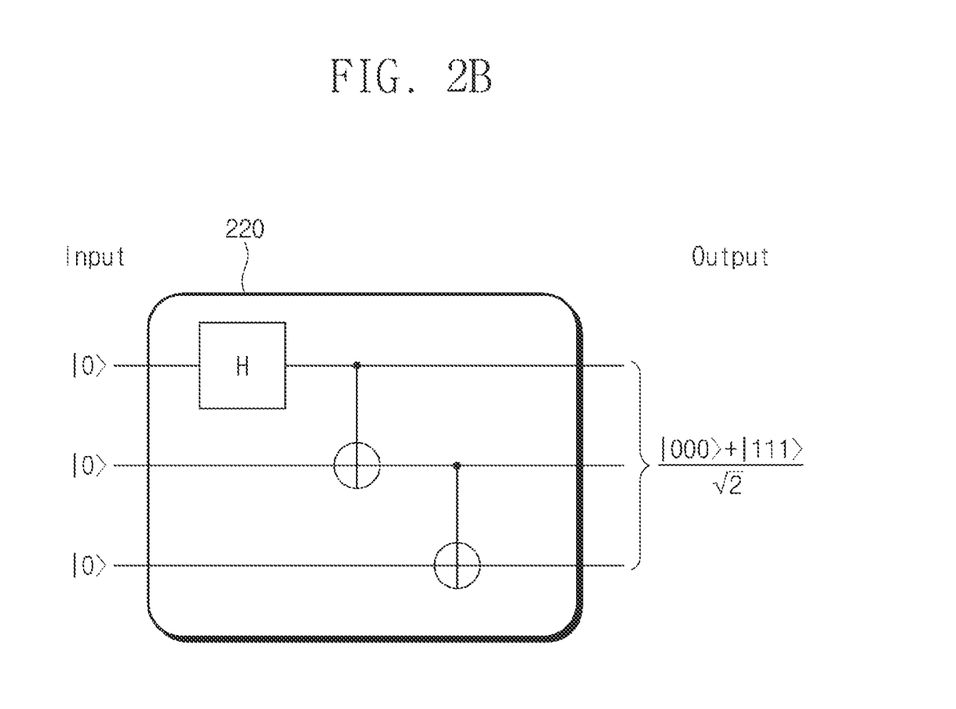
Figure 2C:
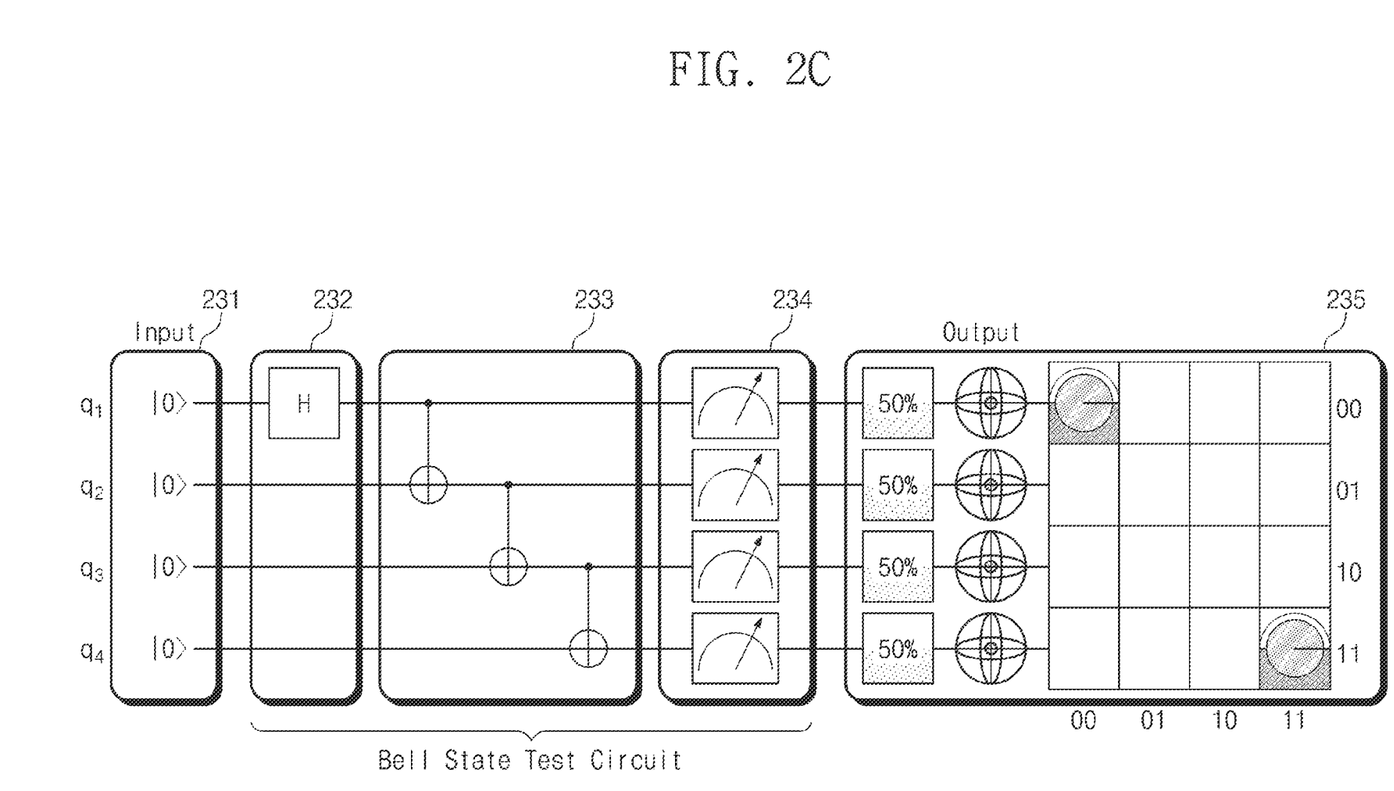

FIGS. 2A to 2C are diagrams illustrating quantum superposition entanglement circuits according to a Bell-state theory.

FIG. 2A illustrates a '-H-CNOT$_{12}$-M-', which is a 2-qubit Bell state-test circuit. A 2-qubit Bell state test circuit 210 includes a Hadamard gate (H) and a CNOT (Controlled NOT) gate 212. An initial input of the 2-qubit Bell state test circuit 210 is to check the output '(|0>+|1>)/√2', which is the result of quantum entanglement, when '|0>' is input to all qubits ($q_1$, $q_2$). Even if the number of qubits increases, it is possible to check the characteristic that only the first and last basis vectors are output ('(|00>+|11>)/√2', '(|000>)/√2'). In this case, the Hadamard (H) gate (H) and the CNOT gate 212 are basic gates of the quantum circuit. Applying these basic gates to the 2-qubits may be represented by a circuit such as that of FIG. 2A described above. In addition, when this is checked by the quantum simulation, the output result (('|00>+|11>)/√2') is confirmed.

FIG. 2B illustrates a '-H-CNOT$_{12}$-CNOT23-M-', which is a 3-qubit Bell state test circuit. Referring to FIG. 2B, a 3-qubit Bell state test circuit 220 may be represented by the Hadamard gate (H) and two CNOT gates. The theoretical proof by confirming the quantum entanglement or the quantum superposition among 3-qubits is called a GHZ state (Greenberger-Horne-Zeilinger state). When this is generalized, it may be expanded to a plurality of N-qubits. An expression for the quantum entanglement corresponding to the GHZ state may be expressed by Equation 1 below.

$$|GHZ\rangle = \frac{1}{\sqrt{d}} \sum_{i=0}^{d-1} |i\rangle \otimes \ldots \otimes |i\rangle = \frac{1}{\sqrt{d}} \Big(|0\rangle \otimes \ldots \otimes |0\rangle +$$ [Equation 1]

$$\ldots + |d-1\rangle \otimes \ldots \otimes |d-1\rangle\Big)$$

In addition, when each subsystem is two-dimensional, it may be expressed by Equation 2.

$$|GHZ\rangle = \frac{|0\rangle^{\otimes M} + |1\rangle^{\otimes M}}{\sqrt{2}}, \text{ Or}$$ [Equation 2]

$$|GHZ\rangle = \frac{|000\rangle + |111\rangle}{\sqrt{2}}$$

The above-described GHZ state represents a maximally entangled quantum state, and the state of all subsystems are '|000>'→>'0' and '|111>'→'1' at the same time, indicating a quantum superposition result. The result of the above equation means the output state of the simplest 3-qubits.

FIG. 2C illustrates a 'H-CNOT12-CNOT23-CNOT34-M-', which is a 4-qubit Bell state test circuit. Referring to FIG. 2C, the 4-qubit Bell state test circuit may be implemented in a time-series order as illustrated. First, initialization 231 is performed for the 4-qubit inputs. Then, the Hadamard (H) gate is applied (232) to the qubit $q_1$ for the superposition. Next, the CNOT gate is applied (233) in a cascade among a qubit $q_2$, a qubit $q_3$, and a qubit $q_4$ for the quantum entanglement. Finally, a bell state test is performed by applying a measurement gate 234. The Bell state test circuit presents output 235 as an output as a math-based prediction. The N-qubit test may be applied by expanding the CNOT gate in the same way. Through such the Bell state test circuit, it is possible to test a quantum qubit device, a simulator, or a physical qubit device in the maximum quantum entanglement state.

Figure 3:
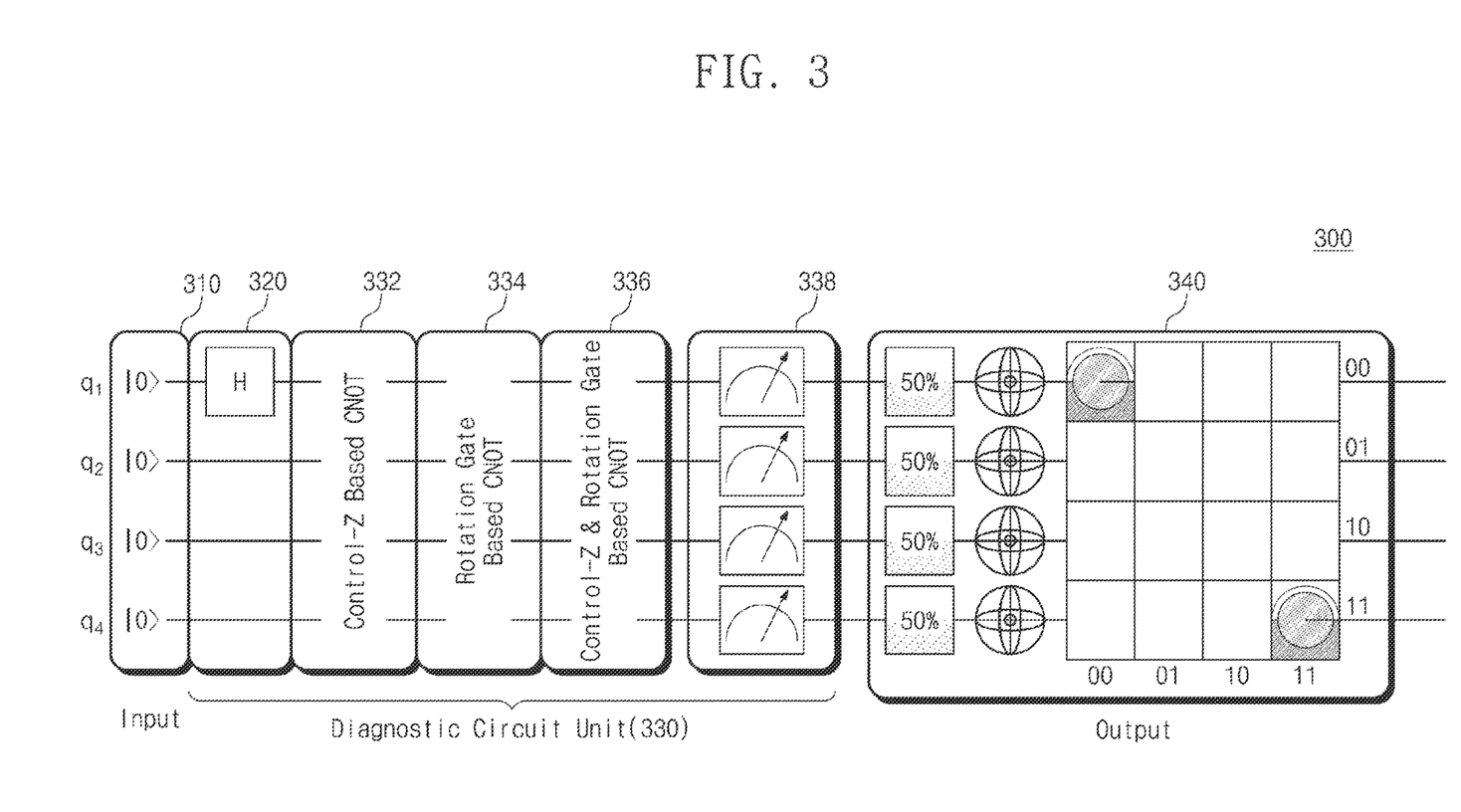
FIG. 3 is a diagram schematically illustrating a 4-qubit quantum diagnostic circuit according to an embodiment of the present disclosure.

FIG. 3 is a diagram schematically illustrating a 4-qubit quantum diagnostic circuit according to an embodiment of the present disclosure. Referring to FIG. 3, a quantum diagnostic circuit 300 may be configured with an input unit 310, a diagnostic circuit unit 330, and an output unit 340.

The input unit 310 sets all qubits $q_1$, $q_2$, $q_3$, and $q_4$ to '|0>' for input initialization in the initialization step.

A Hadamard gate 320 constituting the diagnostic circuit unit 330 quantum superposition states of all qubits used through the Hadamard (H) gate to the first qubit $q_1$. Then, a replacement gate 332 corresponding to the CNOT gate is applied for a quantum entanglement between two qubits in the quantum superposition states. By repeatedly applying a replacement gate 334 and a replacement gate 336 of the CNOT gate, the number of qubits is increased. In addition, a final state may be measured in the measurement circuit 338. However, in this case, the Bell-state is maintained as it is. That is, it exhibits quantum entanglement characteristics.

In this case, the replacement gates 332, 334, and 336 may be replaced with one another. That is, the replacement gate 332 may be replaced with any one of the replacement gates 334 and 336. The replacement gate 334 may be replaced with any one of the replacement gates 332 and 336. The replacement gate 336 may be replaced with any one of the replacement gates 332 and 334.

The 4-qubit inputs illustrated by way of example may be expanded to more N-qubit inputs ('N' is a natural number greater than 4). When the number of inputs is expanded, the inputs are increased by two, and it is also possible to add any one of the first CNOT gate to the third CNOT gate to rear stage of the last CNOT gate or replacement gate before the expansion.

The quantum diagnostic circuit 300 of FIG. 3 has the same function and purpose as the 4-qubit Bell state test circuit of FIG. 2C but is a circuit expanded to be widely used for quantum property analysis by changing the quantum circuit gates. This feature will be described in more detail with reference to FIGS. 4A to 4C which will be described later.

Figure 4A:
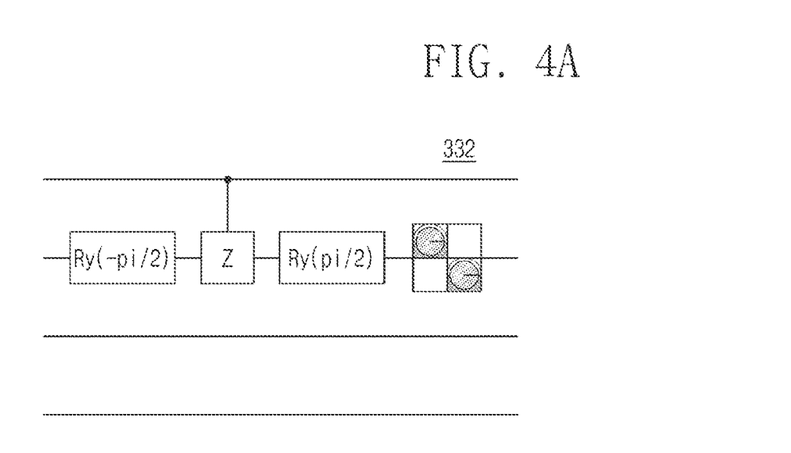
FIGS. 4A to 4C are diagrams illustrating in more detail a configuration of replacement gates of a diagnostic circuit unit of FIG. 3.
Figure 4B:
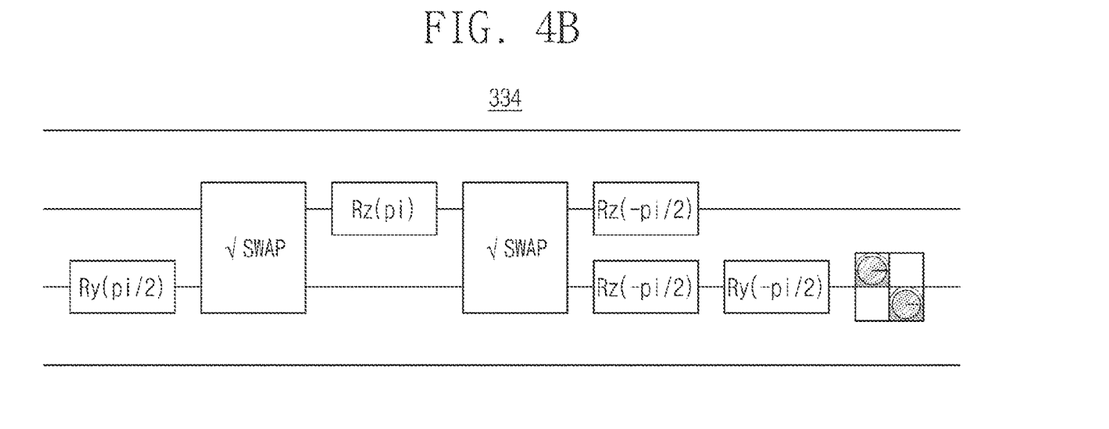
Figure 4C:
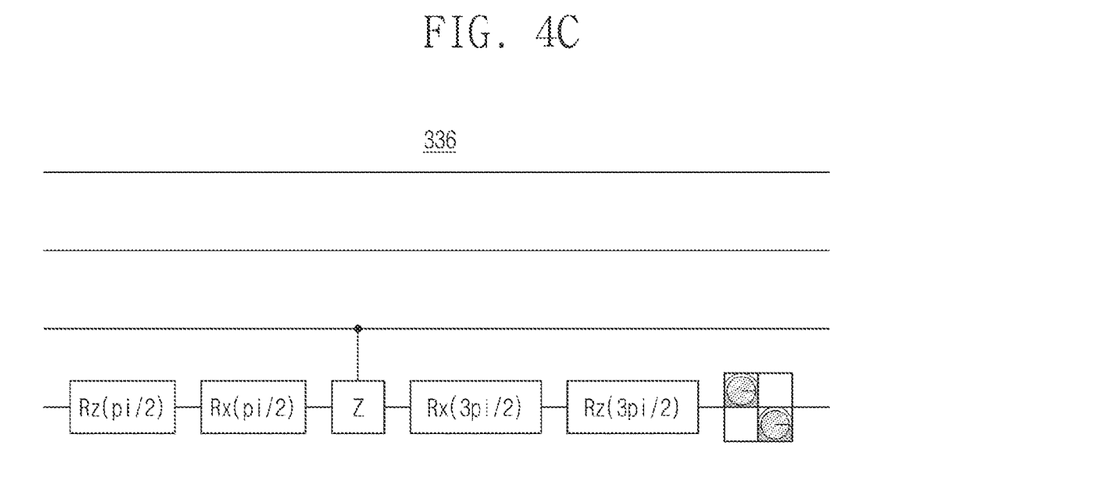

FIGS. 4A to 4C are diagrams illustrating in more detail a configuration of replacement gates of a diagnostic circuit unit of FIG. 3. FIG. 4A illustrates the replacement gate 332 of the diagnostic circuit unit 330 of FIG. 3. Referring to FIG. 4A, the quantum superposition is applied to the initialized qubit $q_1$ through the Hadamard (H) gate. Then, it is necessary to apply a quantum entanglement between 2-qubits corresponding to the CNOT gate described in FIG. 2A. However, to examine the quantum state superposition and entanglement effect through the Control-Z gate-based quantum entanglement circuit, CNOT12 is modified and applied as illustrated. That is, the Control-Z-based CNOT 332 uses a Rotation Gate Ry(θ) and a Control-Z Gate. Control-Z-based CNOT 332 creates an entanglement with the Control-Z gate between the first qubit $q_1$ and the second qubit $q_2$, but rotates Ry(θ) by π/2 with respect to the second qubit $q_2$. The CNOT effect is shown only when the circuits are connected in series in this order, and it is sometimes described as a 'Control-Z-based CNOT=−Ry$_2$(−π/2)-CZ-Ry$_2$(π/2)−'.

Rotation and phase shift gate 'Rx, Ry, Rz' used in this case is single gate and is an operator that act only on the corresponding qubits, and specifically refer to rotation by an angle θ with respect to a corresponding axis as illustrated in Equation 3 below. The rotation gate (or phase shift gate) may be expressed by Equation 3 below.

$$R_x(\theta) = \begin{pmatrix} \cos\left(\frac{\theta}{2}\right) & -i\sin\left(\frac{\theta}{2}\right) \\ -i\sin\left(\frac{\theta}{2}\right) & \cos\left(\frac{\theta}{2}\right) \end{pmatrix}$$ [Equation 3]

$$R_y(\theta) = \begin{pmatrix} \cos\left(\frac{\theta}{2}\right) & -\sin\left(\frac{\theta}{2}\right) \\ \sin\left(\frac{\theta}{2}\right) & \cos\left(\frac{\theta}{2}\right) \end{pmatrix}$$

$$R_z(\theta) = \begin{pmatrix} e^{-i\frac{\theta}{2}} & 0 \\ 0 & e^{i\frac{\theta}{2}} \end{pmatrix} = \begin{pmatrix} 1 & 0 \\ 0 & e^{i\theta} \end{pmatrix}$$

FIG. 4B illustrates the replacement gate 334 of the diagnostic circuit unit 330 of FIG. 3. Referring to FIG. 4B, the replacement gate 334 is illustrated for applying the quantum entanglement and superposition between qubits between the second and third qubits $q_2$ and $q_3$. The replacement gate 334 is characterized in that the entanglement is made between the 2-qubits $q_2$ and $q_3$ by using a square root swap (√/SWAP) gate. At the same time, the replacement gate 334 is expressed as illustrated by applying a phase change using the rotation gates Rx(θ), Ry(θ), and Rz(θ), and has the same effect as a CNOT gate. Accordingly, the replacement gate circuit 334 has a feature that may maintain quantum characteristics by applying the rotation to the three-dimensional phase space. In this case, the replacement gate circuit 334 necessarily includes the same configuration as in FIG. 4B and exhibits the same effect as the CNOT gate.

The above-described square root swap (√SWAP) gate may be expressed by Equation 4 below.

$$\sqrt{SWAP} = \begin{bmatrix} 1 & 0 & 0 & 0 \\ 0 & \frac{(1+i)}{2} & \frac{(1-i)}{2} & 0 \\ 0 & \frac{(1-i)}{2} & \frac{(1+i)}{2} & 0 \\ 0 & 0 & 0 & 1 \end{bmatrix} \quad \text{[Equation 4]}$$

The square root swap (√SWAP) gate is a circuit gate that performs a Half SWAP between 2-qubits. The order of applying the rotation gates to these two gates and the front and rear is the same as the replacement gate 334 illustrated in FIG. 4B. When this is described in symbols, it may be written as 'Ry$_3$(θ)-√SWAP$_{23}$-Rz$_2$(θ)-√SWAP$_{23}$-Rz$_2$(θ). RZ$_3$(θ)-Ry$_3$(θ)-'. Replacement gates 334 are also connected in series to exhibit the same effect as CNOT$_{23}$. The reason is to analyze the qubit characteristics or to search a gate support by simultaneously applying the replacement gates to diagnose the error, even if a test consisting of only CNOT gate passes or fails by default, by changing the configuration although it is complicated.

FIG. 4C illustrates the replacement gate 336 of another CNOT gate of the diagnostic circuit unit 330 of FIG. 3. Referring to FIG. 4C, the replacement gate 336 of the CNOT gate may include the Control-Z gate and the rotation gate. When the replacement gate 336 is expressed by a symbol, it may be expressed as 'Rz$_4$(θ)-Rx$_4$(θ)-CZ$_{34}$-Rx$_4$(θ)-Rz$_4$(θ)-', and internal circuits are connected in series. The reason for such a modification is to check whether the gate is supported by using multiple gates and to perform a diagnostic test by reflecting changes for each gate. In addition, this circuit may also be used for the same purpose as the CNOT gate, and when CNOT is not supported, it will be possible to implement the CNOT gate by using the Control-Z in the manner described above.

According to FIGS. 4A to 4C, the diagnostic circuit unit 330 may be expanded depending on the number of qubits used. By applying the same method illustrated in FIGS. 4A to 4C, the diagnostic circuit unit 330 may be connected between the 2-qubits in parallel in a cascade manner. Also, finally, the measurement circuit 338 for measuring the final state of the diagnostic circuit unit 330 is applied.

When the final state by the application of the measurement circuit 338 is 4-qubit, like the output unit 340, $2^4=16$ quantum probability amplitude state values may be obtained, and it is necessary to check whether it is the Bell state.

According to FIGS. 3 and 4A to 4C described above, a diagnostic circuit that is designed to generate and combine the quantum superposition, the quantum entanglement, and the quantum measurements in series, but to maintain the Bell-state may be provided.

Figure 5:
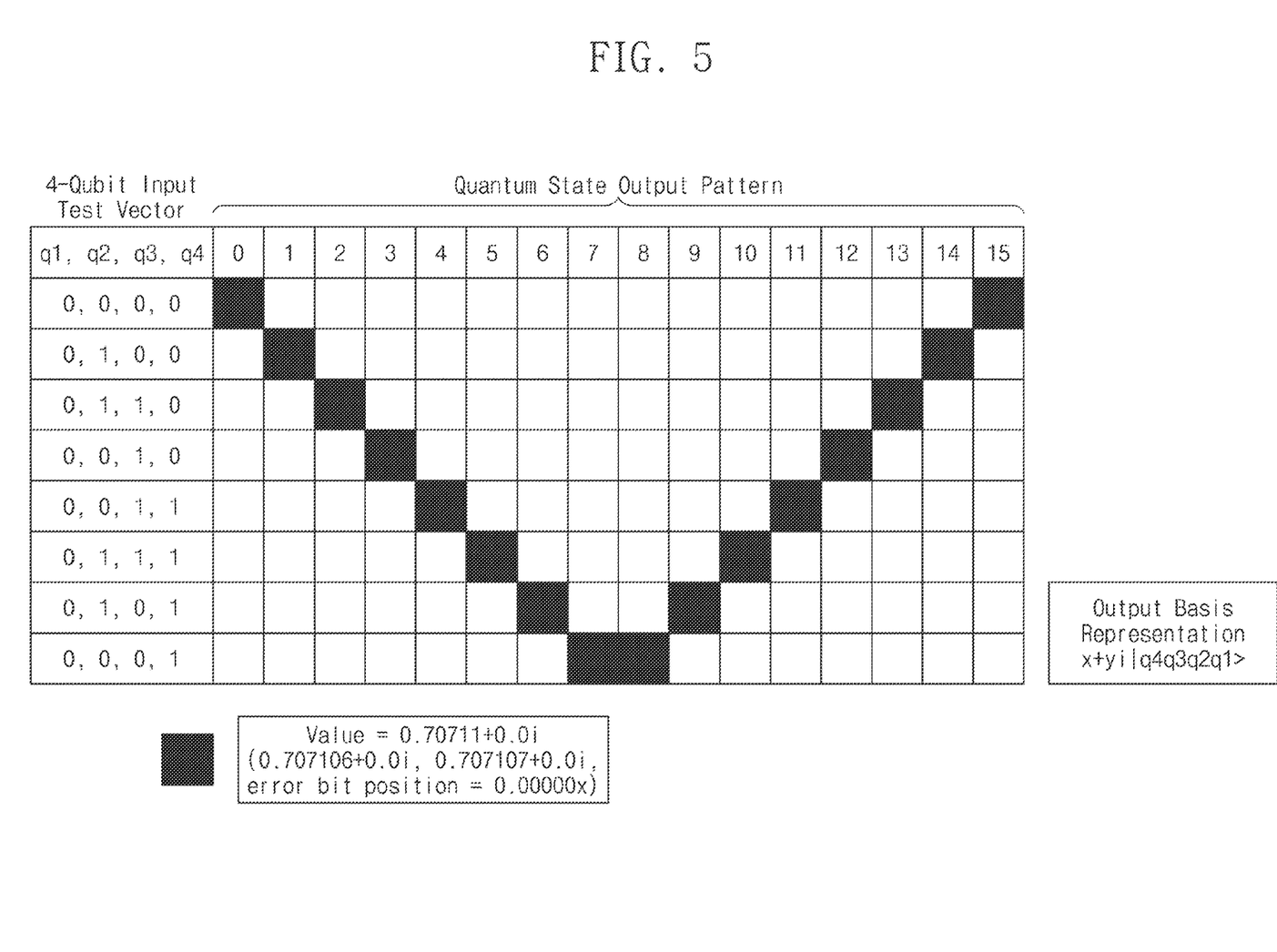
FIG. 5 is a table illustrating a standard pattern for input/output diagnosis according to an embodiment of the present disclosure.

FIG. 5 is a table illustrating a standard pattern for input/output diagnosis according to an embodiment of the present disclosure. An experiment is performed by applying the same input conditions to the quantum diagnostic circuit 300 (refer to FIG. 3) described above. That is, '|0>' is input to all qubits $q_1$, $q_2$, $q_3$, $q_4$ in the input unit 310 of the quantum diagnostic circuit 300, gates of the diagnostic circuit unit 330 are applied, a measurement is performed by the measurement circuit 338, and then a result is provided to the output unit 340. In this case, when the output result of the output unit 340 is in the Bell state, it may be determined as normal. On the other hand, when the output result is not in the Bell state, the 4-qubit input test vector illustrated in FIG. 5 is varied and input, and the output is monitored. When the output result of the quantum state is equal to '|psi>=0.70711+0.0i0000>+0.70711+0.0i1111>', which is the first column of the table of FIG. 5, it means a normal state. The relationship between the input vector and the output vector may be illustrated as illustrated in FIG. 5.

Again, referring to FIG. 5, to diagnose input/outputs, the result of characteristics of the quantum circuit may be collected while the input condition is variable to 0→1→'+'→'−' for each qubit $q_1$, $q_2$, $q_3$, and $q_4$ as a test vector. For an input test vector (0, 0, 0, 0), when the output state vector is a pattern (0.70711, 0, 0, 0, 0, 0, 0, 0, 0, 0, 0, 0, 0, 0, 0, 0.70711), it means that it is in a normal state. That is, '|0000>'→'0.70711+0.0i0000>+0.70711+0.0i1111>' means that the Bell state is maintained. When for the input test vector (0, 0, 0, 0), the output is obtained as the following, other quantum state vectors, any error in the qubits used is suspected. That is, for the input of '|0000>', when the output pattern is only '0.70711+0.0i' in state '1' and state '14' as in a second row, it may be determined that there is an error in the qubit $q_2$. That is, '0.70711+0.00001>+0.70711+0.0i0110>' is the same as the error input to the qubit $q_2$, so it is diagnosed as an error. In the same way, it may be suspected that an error is occurred in the corresponding qubit that is '1' with respect to the input test vector corresponding to the output pattern.

When the result is not in the normal pattern, the next step is to change the input pattern to diagnose a specific qubit error. The input vector is constructed as '(0, 0, 0, 0)→(0, 1, 0, 0)→(0, 1, 1, 0)→(0, 0, 1, 0)→(0, 0, 1, 1)→(0, 1, 1, 1)→(0, 1, 0, 1)→(0, 0, 0, 1)' and tested like a chain, the output pattern is indicated as illustrated on the right of the table in FIG. 5. In this case, a 1-qubit error check may be detected as (0, 1, 0, 0), (0,0, 1, 0), (0, 0, 0, 1). The first qubit error detects a change even when '|+>' or '|−>' is input.

As for the method of changing the test vector to the quantum control device, it is also possible to vary the input initial condition using an X-gate. FIG. 5 illustrates an input/output pattern of a 4-qubit quantum diagnostic circuit, and when the number of qubits increases, the input/output pattern may be generated and applied in the same way.

Figure 6:
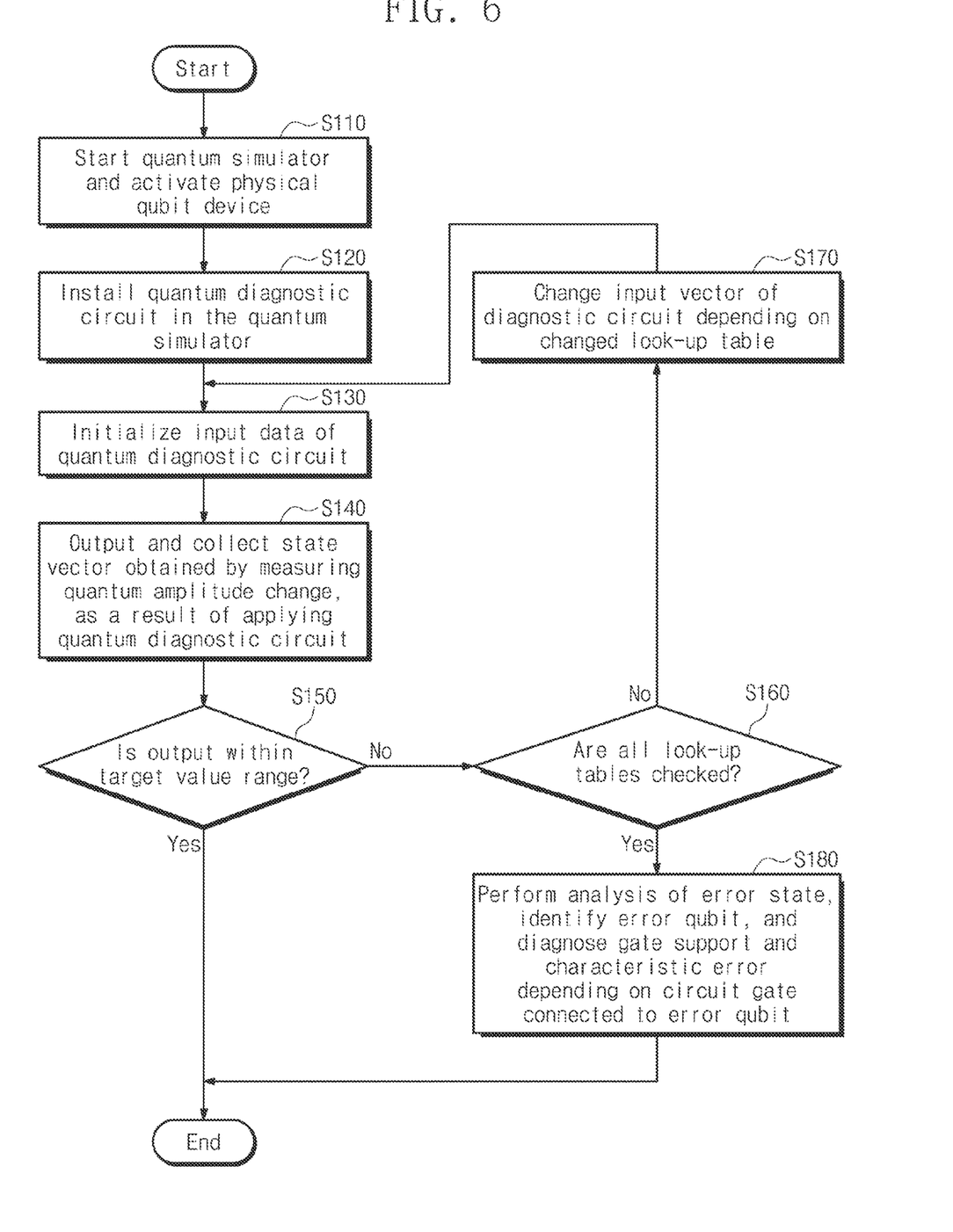
FIG. 6 is a flowchart illustrating a method of applying a quantum diagnostic circuit of the present disclosure.

FIG. 6 is a flowchart illustrating a method of applying a quantum diagnostic circuit of the present disclosure. Referring to FIGS. 1A and 6, it is possible to easily diagnose the state and characteristics of physical qubits in the quantum superposition and entanglement state through the application of the quantum diagnostic circuit of the present disclosure. In addition, when a problem is found during quantum simulation or circuit execution, it is possible to collect characteristic information that may remove the problem in advance. In more detail, it is as follows.

In operation S110, the quantum program and circuit simulation unit 110 or the physical qubit device 130 of the system 100 is started up.

In operation S120, the quantum program and circuit simulation unit 110 installs the quantum diagnostic circuit 111 in the quantum simulator 115 or the physical qubit device 130.

In operation S130, the quantum program and circuit simulation unit 110 initializes the quantum diagnostic circuit 111. That is, the quantum program and circuit simulation unit 110 initializes the input of the quantum diagnostic circuit.

In operation S140, the quantum program and circuit simulation unit 110 measures a change in quantum amplitude appearing as a result of applying the quantum diagnostic circuit 111. Next, the quantum program and circuit simulation unit 110 outputs the measured state vector and collects the result.

In operation S150, the quantum program and circuit simulation unit 110 checks whether the output is included in the target value range. When the output is included in the target value range (Yes direction), it is determined that the circuit is normal, and all procedures are finished. In contrast, when the output is out of the target value range (No direction), the procedure moves to operation S160. In more detail, for the initial input vector (0,0,0,0) of the quantum circuit, the output vector (probability amplitude values (0.70711+0.0i|0000> and 0.70711+0.0i|1111)> only for index=0 and 15) is checked. When an expected vector is output, the procedure ends normally. When the expected target probability amplitude value does not correspond to the output state vector index illustrated in FIG. 5, in the case of 4-qubit, it is checked whether it is a look-up table state value of 8 patterns {i=(1,14), (2,13), (3,12), (4,11), (5,10), (6,9), (7,8)} of FIG. 5. In this case, when the corresponding pattern is checked, and when detailed analysis is performed to analyze the corresponding qubit error and the result vectors according to the eight initialization state variations are collected, the characteristics of the quantum circuit may be analyzed.

In operation S160, it is determined whether the check for all look-up tables is completed. When all look-up tables are checked (Yes direction), the procedure moves to operation S180. In contrast, when the check for all look-up tables is not performed (No direction), the procedure moves to operation S170 to perform diagnosis by changing an additional input test vector.

In operation S170, the input vector of the diagnostic circuit is changed depending on the changed look-up table because the check for all look-up tables is not performed. That is, a collation position of the look-up table of FIG. 5 is adjusted. Then, the procedure returns to operation S130.

In operation S180, an analysis of the error state is performed. An error qubit will be identified by the quantum diagnostic circuit 111, and a gate support error and a characteristic error will be diagnosed depending on the circuit gate connected to the identified error qubit. When the overall analysis of the error conditions is completed, the entire diagnostic procedure is terminated.

In this case, by collecting the result vectors according to the eight initialization state variations, it is possible to analyze the characteristics of the quantum circuit.

A valid state value is a pattern (0.70711+0.0i|0000>, 0.70711+0.0i|1111>) to (i=0.15). An error state value is a pattern (0.70711+0.0i|0001>, 0.70711+0.0i|1110>) to (i=1, 14). An error state value is a pattern (0.70711+0.0i|0010>, 0.70711+0.0i|1101>) to (i=2,13). An error state value is a pattern (0.70711+0.0i|10011>, 0.70711+0.0i|11100>) to (i=3,12). An error state value is a pattern (0.70711+0.0i|0100>, 0.70711+0.0i|1011>) to (i=4,11). An error state value is a pattern (0.70711+0.0i|0101>, 0.70711+0.0i|1010>) to (i=5,10). An error state value is a pattern (0.70711+0.0i|0110>, 0.70711+0.0i|1001>) to (i=6,9). An error state value is a pattern (0.70711+0.0i|0111>, 0.70711+0.0i|1000>) to (i=7,8). For status values other than this, error diagnosis should be made in another way.

When the state value corresponds to the error state output pattern, the corresponding qubit error is diagnosed according as the error state output pattern corresponds to which pattern of the output patterns of FIG. 5 while the result output from the initial input vector state does not appear as a result of superimposing |0> and |1>. In detail, when error state value is observed as a pattern {(0.70711+0.0i|0001>, 0.70711+0.0i|1110>) to (i=1,14)}, since the qubit $q_2$ in the input vector is an error, it is possible to determine the error of the qubit $q_2$ by observing the output of the qubit $q_4$ in quantum superposition and entanglement experiments. For more detailed analysis, the input test vector of FIG. 4 is varied, and operations S130 to S170 are repeatedly tested. The error characteristics are diagnosed in operation S180 according to the output state vector collected in this case and the gate used in the circuit configuration.

The diagnostic circuit uses one circuit, but is based on the principle of diagnosing the error qubit depending on the result of the detected output state vector for the input condition while varying the initial condition of the input according to a rule. A specific method of diagnosis performed in operation S180 is as follows.

When there is an error in the qubit $q_1$, an error will be detected in the probability amplitude vector 14, and when all are normal in the target test of the qubit $q_4$, only 0 and 15 should be detected until the probability amplitude state vector 16 ($2^4$). When there is an error in the qubit $q_2$, an error value is detected to the probability amplitude state vectors 3 and 12. In addition, when there is an error in the qubit $q_3$, an error value are detected to the probability amplitude state vectors 7 and 8, and all other output values are zero (0).

In addition, since the circuit gate combination corresponding to the qubit is uniform, the remaining checks are performed according to the error as follows. When there is an error in qubit $q_1$, the replacement gate Control-Z, Rotation Gate, and H gate corresponding to the CNOT gate of the diagnostic circuit need to be checked, and when there is an error in qubit $q_2$, also Ry-gate and √ SWAP gate implementation may be questionable. Next, when there is an error in the qubit $q_3$, the Rx-gate, Ry-Gate, and Control-Z gate may be suspected. According to the measurement result, when the corresponding probability amplitude value is a reference value (0.70711+0.0i), it is confirmed as an error.

A method for diagnosing quantum characteristics of a quantum computer or the physical qubit device 130 using the quantum diagnostic circuit 111 of the present disclosure may be configured in the following operations.

(a) starting up a quantum computer or the physical qubit device;
(b) connecting a quantum control system with the quantum computer or the physical qubit device;
(c) decoding the quantum diagnostic circuit by the quantum control system and installing the quantum diagnostic circuit in the quantum computer or the physical qubit device;
(d) collecting and analyzing a change in a quantum physical state of the quantum computer or the physical qubit device via the quantum control system, by using the quantum diagnostic circuit;
(e) determining that the quantum physical state of the quantum computer or the physical qubit device is normal when the analyzed change in the quantum physical state is within a range of an expected target value, and determining that the quantum computer or the physical qubit device includes an error when the analyzed change in the quantum physical state is out of the range of the expected target value; and
(f) iterating operations (a) to (e) by varying an input vector of the quantum diagnostic circuit, based on a pre-generated look-up table (refer to FIG. 5) when it is determined that the error is included in the physical qubit device.

The quantum characteristic diagnosis method of the present disclosure may further include, after performing operation (f), finding a physical qubit corresponding to the error from a correlation between an input vector and an output vector of the look-up table, and determining that the error is due to a gate applied to the physical qubit.

The look-up table used in the quantum characteristic diagnosis method of the present disclosure indicates the correlation between the input vector and the output vector. In the case of a 4-qubit quantum computer or a 4-qubit physical qubit device, the input vector and output vector may be configured as a pattern as shown in Equation 5 below. Equation 5 below corresponds to a mathematical expression for the look-up table of FIG. 5.

[Equation 5]

When expressed in |input>→|output>format, $|q_1 q_2 q_3 q_4\rangle \rightarrow |q_1' q_2' q_3' q_4'\rangle$ $q_1 \sim 4$ $|0000\rangle \rightarrow (0.70711+0.0i|0000\rangle + 0.70711+0.0i|1111\rangle)$ (normal)

$|0100\rangle \rightarrow (0.70711+0.0i|0001\rangle + 0.70711+0.0i|1110\rangle)$(error diagnosis)

$|0110\rangle \rightarrow (0.70711+0.0i|0010\rangle + 0.0711+0.0i|1101\rangle)$ (error diagnosis)

$|0010\rangle \rightarrow (0.70711+0.0i|0011\rangle + 0.70711+0.0i|1100\rangle)$(error diagnosis)

$|0011\rangle \rightarrow (0.70711+0.0i|0100\rangle + 0.70711+0.0i|1011\rangle)$(error diagnosis)

$|0111\rangle \rightarrow (0.70711+0.0i|0101\rangle + 0.70711+0.0i|1010\rangle)$(error diagnosis)

$|0101\rangle \rightarrow (0.70711+0.0i|0110\rangle + 0.70711+0.0i|1001\rangle)$(error diagnosis)

$|0001\rangle \rightarrow (0.70711+0.0i|0111\rangle + 0.70711+0.0i|1000\rangle)$(error diagnosis)

According to an embodiment of the present disclosure, when the quantum diagnostic circuit of the present disclosure is used, since it is possible to select circuit gates that reflect limitations of qubits used in various quantum algorithms at an early stage, it may be easy to implement a highly reliable quantum circuit.

In the present disclosure, the Hadamard (H) gate, which induces the quantum superposition, and the quantum superposition and the quantum entanglement are implemented as three different circuit gates, and entanglement is induced between them to enable characterization and diagnosis of quantum circuits. In addition, by providing the expected output in advance depending on the change of the input condition, an error diagnosis of qubits and a collection of output characteristics are possible online with response patterns to variable input states. The combination of input and output makes it possible to discriminate between normal and abnormal in a quantum circuit, and when abnormal, it is possible to know that which qubit is in an error and which circuit gate causes a negative effect. Therefore, according to an embodiment of the present disclosure, it is possible to diagnose a quantum circuit-based quantum computer (physical qubit) and to verify a quantum error issue.

According to the proposed quantum diagnostic circuit, it is possible to easily diagnose the state and characteristics of physical qubits in the quantum superposition and entanglement states. In addition, when a problem is found during quantum simulation or circuit execution, it is possible to collect characteristic information that may remove the problem in advance. Repeatedly applying quantum circuits to physical qubits without knowing a state of the quantum device may lead to unnecessary experiments and wasted time due to the effects of erroneous qubits. However, when the present disclosure is applied, it is possible to identify the state of quantum qubits early and optimize the circuit. In addition, since various gates may be tested at once in composing quantum circuits, it is possible to test quantum circuit gates without testing the used gates one by one. In addition, it is possible to provide information to a quantum compiler such that an erroneous qubit among quantum qubits may be removed and a circuit may be generated with the remaining qubits.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A quantum diagnostic circuit comprising:
   an input unit configured to have inputs of at least first to fourth qubits;
   a diagnostic circuit unit configured to receive the first to fourth qubits from the input unit and to provide a quantum superposition and a quantum entanglement; and
   an output unit configured to receive outputs of the diagnostic circuit unit, to determine whether the outputs are in a Bell-state, to vary the inputs based on a pre-generated look-up table when the outputs include an error, to find a qubit corresponding to the error among the at least first to fourth qubits based on a correlation between inputs and outputs of the look-up table, and to determine that the error is due to a gate applied to the qubit, and
   wherein the diagnostic circuit unit includes:
   a Hadamard gate configured to process the first qubit to provide the quantum superposition of the first to fourth qubits;
   a first CNOT gate configured to provide the quantum entanglement between an output of the Hadamard gate and the second qubit;
   a second CNOT gate configured to provide the quantum entanglement between an output of the first CNOT gate and the third qubit; and
   a third CNOT gate configured to provide the quantum entanglement between an output of the second CNOT gate and the fourth qubit, and
   wherein the first CNOT gate, the second CNOT gate, and the third CNOT gate implement the quantum entanglement in different manners from each other.

2. The quantum diagnostic circuit of claim 1, wherein the first CNOT gate is configured to connect a value obtained by rotating a Y-axis phase of the second qubit by −90° and the output of the Hadamard gate to a first Control-Z gate, and configured to rotate a Y-axis phase of an output of the first Control-Z gate by 90°.

3. The quantum diagnostic circuit of claim 1, wherein the second CNOT gate includes a first square root swap (√SWAP) gate configured to receive a value obtained by rotating a Y-axis phase of the third qubit by 90° and an output of the first CNOT gate, and a second square root swap (√SWAP) gate configured to receive a value obtained by rotating a Z-axis phase of a first output of the first square root swap (√SWAP) gate by 180° and a second output of the first square root swap (√SWAP) gate, and
   wherein the second CNOT gate is configured to rotate a Z-axis phase of each of a first output and a second output of the second square root swap (√SWAP) gate by −90°, and then to rotate a phase of the second output in a Y-axis direction by −90°.

4. The quantum diagnostic circuit of claim 1, wherein the third CNOT gate is configured to connect a value obtained by rotating each of a Z-axis phase and an X-axis phase of the fourth qubit by 90° and the output of the second CNOT gate to a second Control-Z gate, and configured to rotate an output of the second Control-Z gate by 270° in an X-axis and 270° in a Z-axis.

5. The quantum diagnostic circuit of claim 1, wherein the diagnostic circuit unit further includes a measurement circuit configured to measure the output of the Hadamard gate and outputs of the first to third CNOT gates.

6. The quantum diagnostic circuit of claim 1, wherein the first CNOT gate is replaceable with the second CNOT gate or the third CNOT gate, the second CNOT gate is replaceable with the first CNOT gate or the third CNOT gate, and the third CNOT gate is replaceable with the first CNOT gate or the second CNOT gate.

7. The quantum diagnostic circuit of claim 1, wherein the fourth qubit is expanded to a plurality of input qubits, the plurality of input qubits are added in units of two qubits, and any one of the first CNOT gate to the third CNOT gate is added to a rear stage of the last CNOT gate before the expansion.

8. The quantum diagnostic circuit of claim 1, wherein the look-up table indicating the correlation between the inputs and the outputs is composed of a pattern of, when expressed in |input>→|output>format, $|q1q2q3q4> \rightarrow |q1'q2'q3'q4'> q1 \sim 4$ $|0000> \rightarrow (0.70711+0.0i|0000> +0.70711+0.0i|1111>)$ (normal)

$|0100> \rightarrow (0.70711+0.0i|0001> +0.70711+0.0i|1110>)$(error diagnosis)

$|0110> \rightarrow (0.70711+0.0i|0010> +0.70711+0.0i|1101>)$(error diagnosis)

$|0010> \rightarrow (0.70711+0.0i|0011> +0.70711+0.0i|1100>)$(error diagnosis)

$|0011> \rightarrow (0.70711+0.0i|0100> +0.70711+0.0i|1011>)$(error diagnosis)

$|0111> \rightarrow (0.70711+0.0i|0101> +0.70711+0.0i|1010>)$(error diagnosis)

$|0101> \rightarrow (0.70711+0.0i|0110> +0.70711+0.0i|1001>)$(error diagnosis)

$|0001> \rightarrow (0.70711+0.0i|0111> +0.70711+0.0i|1000>$(error diagnosis).

\* \* \* \* \*